April 28, 1964
F. KENNEDY
3,130,584
BLAST FURNACE PROBE
Filed Feb. 14, 1961
3 Sheets-Sheet 1
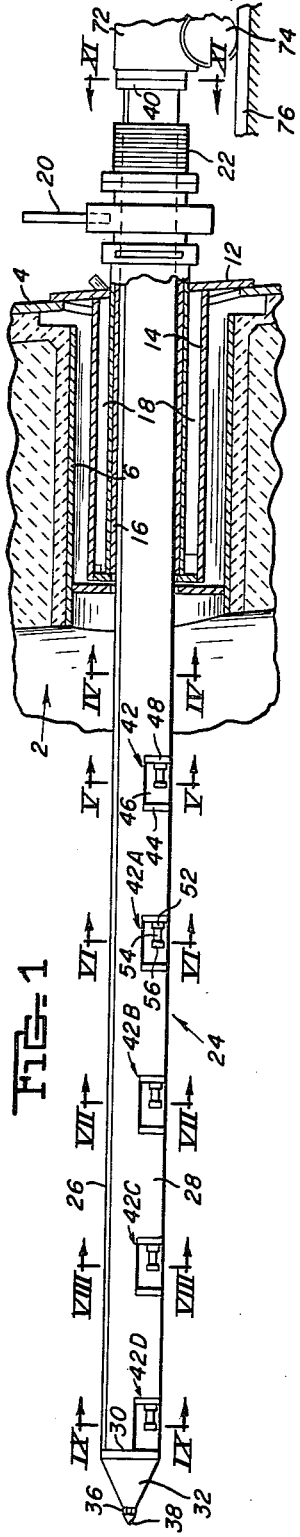
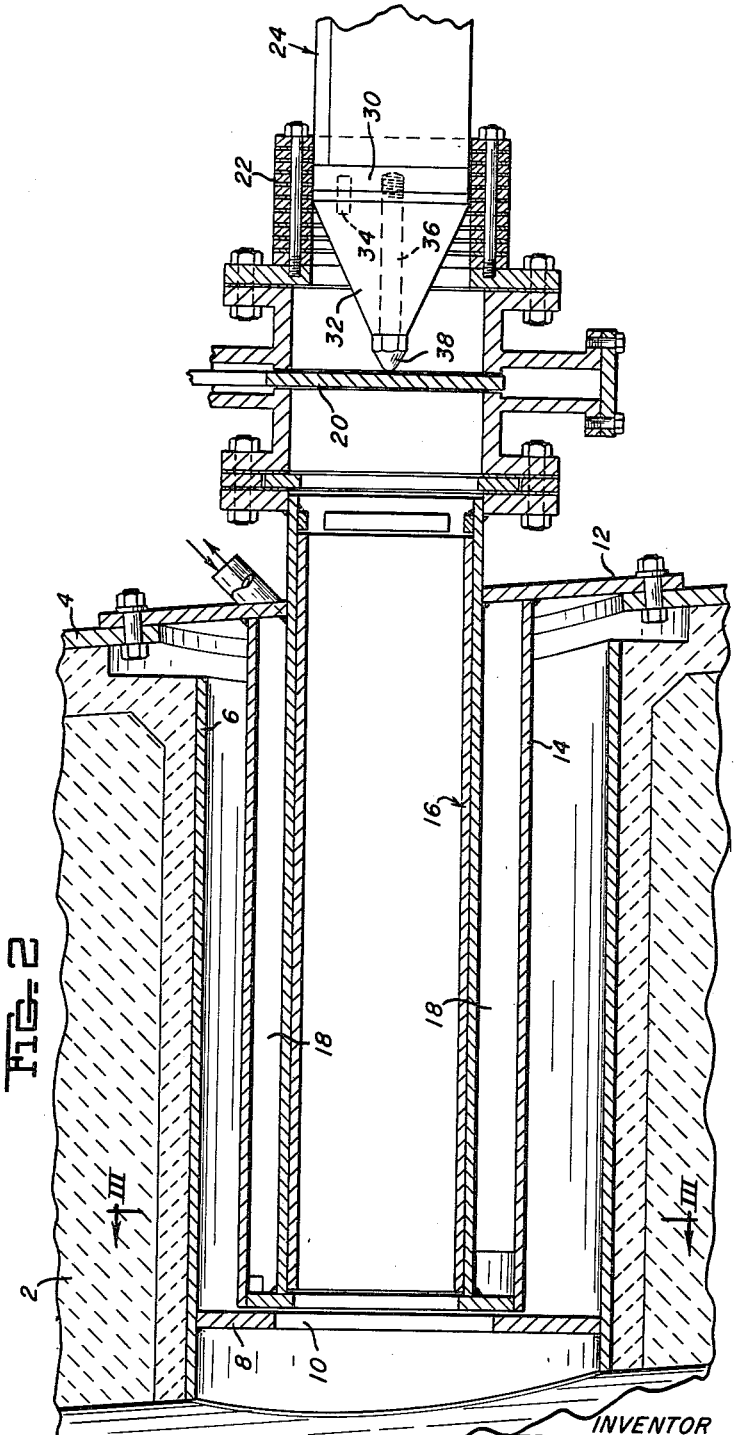
INVENTOR
FRANK KENNEDY
By Donald G. Dalton
Attorney April 28, 1964    F. KENNEDY    3,130,584
BLAST FURNACE PROBE
Filed Feb. 14, 1961    3 Sheets-Sheet 2
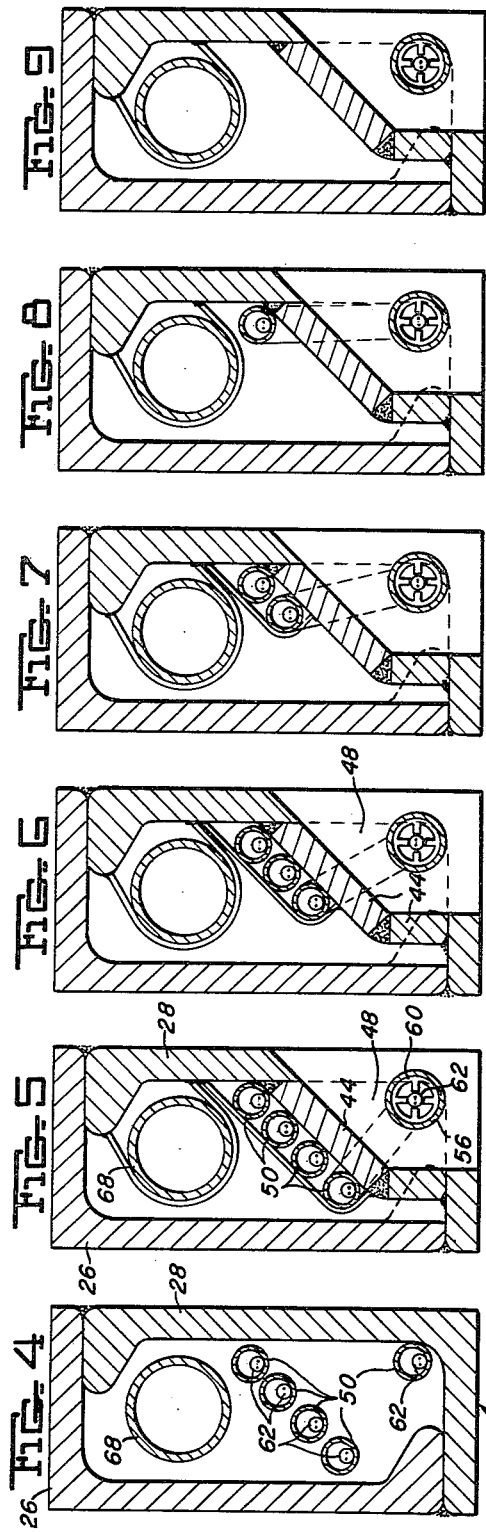
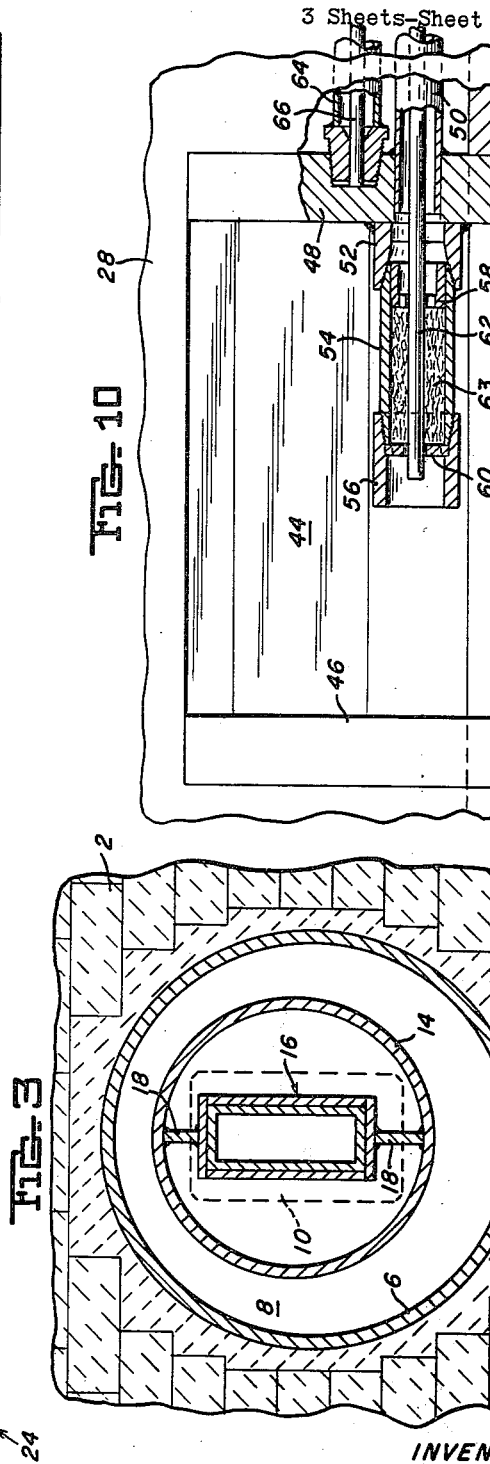
INVENTOR
FRANK KENNEDY
By Donald G. Dalton
Attorney April 28, 1964
F. KENNEDY
3,130,584
BLAST FURNACE PROBE
Filed Feb. 14, 1961
3 Sheets-Sheet 3
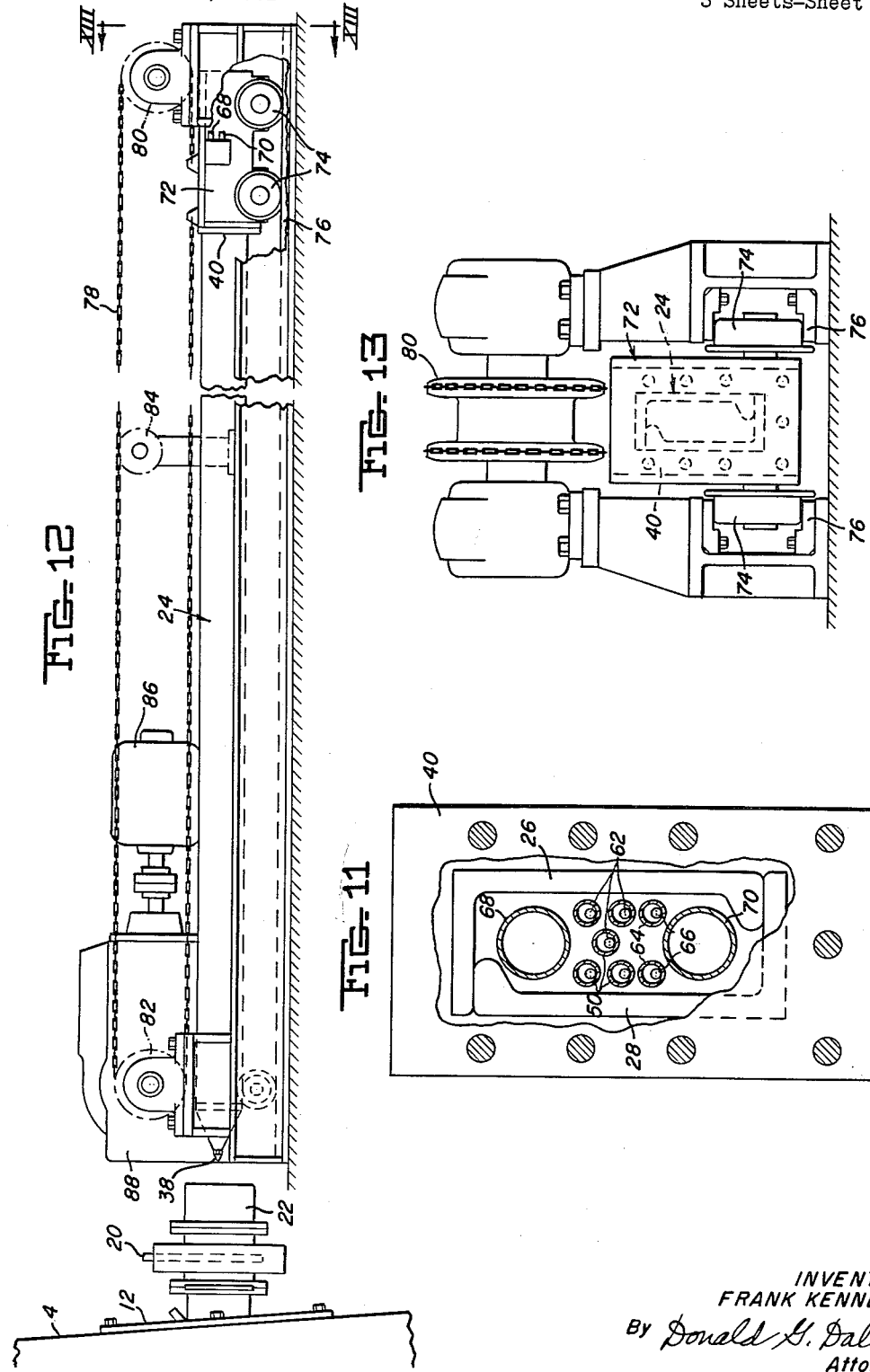
INVENTOR
FRANK KENNEDY
By Donald G. Dalton
Attorney

United States Patent Office 3,130,584
Patented Apr. 28, 1964

3,130,584
BLAST FURNACE PROBE
Frank Kennedy, Johnstown, Pa., assignor to United States Steel Corporation, a corporation of New Jersey
Filed Feb. 14, 1961, Ser. No. 89,165
9 Claims. (Cl. 73—341)

This invention relates to a blast furnace probe and more particularly to such a probe for insertion within the stack of an iron producing blast furnace in order to provide information relating to gas and solids distribution so as to permit adjustments of the burden, hot blast temperature, wind volume and the like in order to prevent and/or correct channeling, scabbing and hanging of the burden. Probes have been used for this purpose to a limited extent, both in this country and abroad, but those in use have various disadvantages. Some can take only one temperature and gas sample without repositioning. Others require that the stockline be lowered each time the probe is inserted in or retracted from the furnace. Most of the foreign probes are stationary and must be built into the furnace. This results in very serious maintenance problems. The gas samples and temperature readings obtained by some probes are not accurate. In general the probes are expensive to fabricate and maintain.

It is therefore an object of my invention to provide a blast furnace probe which can obtain temperature readings and gas samples at a great number of positions across a complete cross section of the furnace stack.

Another object is to provide such a probe which is strong, easy to fabricate and which can be readily inserted and withdrawn from the furnace while the furnace is in operation.

These and other objects will be more apparent after referring to the following specification and attached drawings, in which:

FIGURE 1 is a view, partly in section, of the probe of my invention inserted in a blast furnace;

FIGURE 2 is an enlarged sectional view showing the probe support through the wall of a blast furnace;

FIGURE 3 is a view taken on the line III—III of FIGURE 2;

FIGURE 4 is an enlarged sectional view taken on the line IV—IV of FIGURE 1;

FIGURE 5 is an enlarged sectional view taken on the line V—V of FIGURE 1;

FIGURE 6 is an enlarged sectional view taken on the line VI—VI of FIGURE 1;

FIGURE 7 is an enlarged sectional view taken on the line VII—VII of FIGURE 1;

FIGURE 8 is an enlarged sectional view taken on the line VIII—VIII of FIGURE 1;

FIGURE 9 is an enlarged sectional view taken on the line IX—IX of FIGURE 1;

FIGURE 10 is an enlarged view, partly in section, showing a sampling station;

FIGURE 11 is an enlarged view taken on the line XI—XI of FIGURE 1;

FIGURE 12 is an elevation showing the probe feeding mechanism; and

FIGURE 13 is an enlarged view taken on the line XIII—XIII of FIGURE 12.

Referring more particularly to the drawings reference numeral 2 indicates the wall of a blast furnace having the usual steel shell 4. While only one probe is shown it is preferred to use four probes spaced 90° apart around the periphery of the furnace at a vertical location about 7 ft. below the stockline. An opening is provided through the wall 2 and shell 4, a tube 6 is inserted therein and the opening around the tube sealed with plastic fireclay. In one specific installation the tube 6 is a 24" diameter steel pipe having a transverse plate 8 welded thereto adjacent its inner end. Plate 8 is provided with an opening 10 therein. A plate 12 having a tube 14 attached to its inner side is bolted to the plate 4. A double tubed rectangular guide 16 is welded to the plate 12 within the pipe 14 and is also attached to the pipe 14 by means of lugs 18. The space between the tube 14 and guide 16 is made water-tight so that cooling water can be circulated therethrough. The guide 16 extends outwardly from the plate 12 and a standard gate valve 20 is secured thereto. A seal 22 which also acts as a guide for the probe is secured to the outer end of valve 20. Probe 24 of my invention includes two bulb angles 26 and 28 welded together with the long legs of the angles vertical. In the particular probe mentioned above the bulb angles are 8 in. angles at 24.3 lb. The forward or inner ends of the angles 26 and 28 are closed by means of a plate 30 welded thereto. A tapered plate 32 is attached to plate 30 by means of dowel pin 34 and a bolt 36 threaded into the plate 30. The head of the bolt 36 is built up with weld metal 38 in order to form a point for better penetration through the furnace burden. The outer ends of angles 26 and 28 are closed by means of a plate 40. A plurality of sampling stations 42, 42A, 42B, 42C and 42D are provided along the length of the probe. In forming each of the sampling stations the lower part of angle 28 and a portion of the bulb of angle 26 is cut away at the station as shown in FIGURES 5 to 9 and the opening formed therebetween is closed by plates 44, 46 and 48. The plate 44 may be made of two straight plates welded together as shown or by a single bent plate. Tubes 50, one for each of the stations 42, 42A, 42B, 42C and 42D are supported by the angle 28 and plates 44. The furnace end of each tube 50 is secured in an opening in the associated plate 48 and a threaded sleeve 52 is welded to the plate 48 on the side thereof away from tube 50. A stainless steel nipple 54 is threaded into the sleeve 52 and has a sleeve 56 threaded on its free end. Spiders 58 and 60 provided with the nipple 54 and sleeve 56 position a thermocouple 62 in the center of the tube 50 and nipple 54. The space between the spiders 58 and 60 is preferably filled with steel wool 63 which acts as a filter for the gases passing therethrough. If desired, additional thermocouple tubes 64 may be provided within the probe. Two such tubes 64 are shown in FIGURE 11. Each of these tubes terminate in the plates 48 at two of the sampling stations. A thermocouple 66 within each of the tubes 64 are used to determine the temperature of the metal of the probe. The outer ends of tubes 50 pass through the plate 40 and have T's, not shown, attached thereto so that the thermocouple can lead to a potentiometer (not shown) for recording or indicating temperatures and the gas samples can be delivered to gas analyzing apparatus (not shown). For this purpose flexible connections, not shown, are necessary. The thermocouples 66 also lead to potentiometers (not shown) for indicating or recording the temperature of the probe. A cooling water tube 68 is supported within the probe 24 and extends to the forward end thereof. A drain tube 70 is attached to the probe 24 adjacent the plate 40. The tubes 68 and 70 are attached to a water supply and drain, respectively, through flexible connections, not shown.

In making up the probe 24 the tubes 50, 64 and 68 are mounted on the angle 28 with the thermocouples therein and the angles 26 and 28 welded to each other as shown. The plate 30 is then welded to the tubes 26 and 28 to close the forward end thereof after which the plate 40 is welded to the outer end of angles 26 and 28 to close that end thereof with the tubes 50, 64 and 68 passing therethrough.

The probe may be moved into and out of the furnace by various means such as a rack and pinion, or a cable arrangement actuated by an electric or hydraulic cylinder. In the arrangement shown in FIGURES 12 and 13 plate 40 is attached to a carriage 72 having wheels 74 thereon which are supported by rails 76 for movement toward and away from the furnace. The ends of a chain 78 are attached to the top of the carriage 72. The chain 78 passes around end idler sprocket 80 arranged above and between the tracks 76 at the outer end thereof and a drive sprocket 82 arranged at the forward end of the tracks 76. A sprocket 84 supports the upper run of chain 78 intermediate the sprockets 80 and 82. The sprocket 82 is driven by a motor 86 through a gear reducer 88.

In operation, with the gate valve 20 closed the forward end of the probe 24 will be supported by the seal 22 as shown in FIGURE 2 and the carriage 72 will be in remote position. When it is desired to obtain furnace gas analyses and temperatures the valve 20 is opened and the motor 86 actuated so that the carriage 72 is pulled forwardly by the chain 78 and the probe 24 will move into the furnace through the burden. Because of the relatively small cross section of the probe and because of the arrangement of the point 38 the probe will move readily through the burden into operative position. It will be seen that the support 16 and seal 22 will prevent the blast pressure from blowing gas and coke particles out of the blast furnace when the probe is being inserted and after insertion. True temperature measurements are obtained since there is a stream-lined passage for the gas moving up the furnace and over the hot junction at the end of the thermocouples. Since the gas is continually passing into the tubes 50 the hot junction will attain true temperatures. When four probes are used in the manner described above twenty gas samples and twenty temperatures will be simultaneously obtained. When it is desired to retract the probe from the furnace the motor 86 is operated in the reverse direction and the chain 78 will pull the probe out of the furnace until its point is on the outside of valve 20. During the injection and retraction of the probe from the furnace it is preferred to use a neutral gas, such as nitrogen, to prevent clogging of the gas passages while the probe is moving. The purpose of the thermocouples 66 is to determine the temperature of the steel of the probe itself. Since the structural strength of the probe will decrease when the temperature goes above approximately 550° F. more cooling water will be supplied when the temperature obtained by thermocouples 66 approaches 550° F. If the maximum amount of cooling water is being supplied and the temperature of the steel in the probe still continues to increase the probe will be retracted before its strength is unduly lowered.

While one embodiment of my invention has been shown and described it will be apparent that other adaptations and modifications may be made without departing from the scope of the following claims.

I claim:

1. Apparatus for determining conditions at spaced points within a blast furnace comprising an elongated hollow rectangular member closed at each end and adapted to be slidably inserted and withdrawn from said furnace horizontally through a rectangular opening, said member being of uniform cross section for the majority of its length and having a plurality of cut out sections spaced along its length at the bottom thereof, a generally vertical plate closing each end of each of said cut out sections, means closing the inside of each of said cut out sections, the vertical plate of each cut out section toward the outer end of said member having a hole therethrough, means for circulating coolant through said member and a conduit extending from the entry end of said member through said hole into the associated cut out section.

2. Apparatus for determining conditions at spaced points within a blast furnace comprising a pair of angles having legs of different lengths and fastened together to form a hollow rectangular horizontal member having a uniform cross section for the majority of its length, the first of said angles having its short leg generally horizontal and its long leg extending downwardly, the second of said angles having its short leg generally horizontal and its long leg extending upwardly, said second angle having a plurality of cut out sections spaced along its length at the bottom thereof, a generally vertical plate closing each end of each of said cut out sections, means closing the inside of each of said cut out sections, the vertical plate of each cut out section toward the outer end of said member having a hole therethrough, means for circulating coolant through said member and a conduit extending from the entry end of said member through said hole into the associated cut out section.

3. Apparatus for determining conditions at spaced points within a blast furnace comprising a pair of angles having legs of different lengths and fastened together to form a hollow rectangular horizontal member having a uniform cross section for the majority of its length, the first of said angles having its short leg generally horizontal and its long leg extending downwardly, the second of said angles having its short leg generally horizontal and its long leg extending upwardly, said second angle having a plurality of cut out sections spaced along its length at the bottom thereof, a generally vertical plate closing each end of each of said cut out sections, means closing the inside of each of said cut out sections, the vertical plate of each cut out section toward the outer end of said member having a hole therethrough, a plurality of tubes extending from the outer end of said member one to each of said holes and fastened to the associated plate, a tube fastened to said last named plate at said hole and extending toward the other vertical plate of the associated cut out section, a thermocouple extending through said tubes, a closure for the forward end of said member including a tapered end portion, a closure for the inner end of said member, and means for circulating coolant through said member.

4. Apparatus for determining conditions at spaced points within a blast furnace comprising an elongated probe, a horizontal guide through the wall of said blast furnace, said guide having a rectangular opening therethrough, a valve on the exit side of said guide, a seal and guide on the exit side of said valve, said seal and guide having a rectangular opening horizontally therethrough of the same size as the first mentioned opening, and means for moving said probe through said guides into said furnace, said probe including a hollow rectangular member closed at each end and having a uniform cross section slightly smaller than the openings in said guides and seal throughout the majority of its length, said member having a plurality of cut out sections spaced along its length at the bottom thereof, a generally vertical plate closing each end of each of said cut out sections, means closing the inside of each of said cut out sections, the vertical plate of each cut out section toward the outer end of said member having a hole therethrough, means for circulating coolant through said member and a conduit extending from the entry end of said member through said hole into the associated cut out section.

5. Apparatus for determining conditions at spaced points within a blast furnace comprising an elongated probe, a horizontal guide through the wall of said blast furnace, said guide having a rectangular opening therethrough, a valve on the exit side of said guide, a seal and guide on the exit side of said valve, said seal and guide having a rectangular opening horizontally therethrough of the same size as the first mentioned opening, and means for moving said probe through said guides into said furnace, said probe including a pair of angles having legs of different lengths and fastened together to form a hollow rectangular member, said hollow rectangular member having a uniform cross section slightly smaller than the opening in said guides and seal throughout the majority of its length, the first of said angles having its short leg generally horizontal and its long leg extending downwardly, the second of said angles having its short leg generally horizontal and its long leg extending upwardly, said second angle having a plurality of cut out sections spaced along its length at the bottom thereof, a generally vertical plate closing each end of each of said cut out sections, means closing the inside of each of said cut out sections, the vertical plate of each cut out section toward the outer end of said member having a hole therethrough, means for circulating coolant through said member and a conduit extending from the entry end of said member through said hole into the associated cut out section.

6. Apparatus for determining conditions at spaced points within a blast furnace comprising an elongated probe, a horizontal guide through the wall of said blast furnace, said guide having a rectangular opening therethrough, a valve on the exit side of said guide, a seal and guide on the exit side of said valve, said seal and guide having a rectangular opening horizontally therethrough of the same size as the first mentioned opening, and means for moving said probe through said guides into said furnace, said probe including a pair of angles having legs of different lengths and fastened together to form a hollow rectangular member, said hollow rectangular member having a uniform cross section slightly smaller than the opening in said guides and seal throughout the majority of its length, the first of said angles having its short leg generally horizontal and its long leg extending downwardly, the second of said angles having its short leg generally horizontal and its long leg extending upwardly, said second angle having a plurality of cut out sections along its length at the bottom thereof, a generally vertical plate closing each end of each of said cut out sections, means closing the inside of each of said cut out sections including a plate extending diagonally from the vertical leg of said second angle toward its horizontal leg, the vertical plate of each cut out section toward the outer end of said probe having a hole therethrough, a tube extending from the outer end of said probe to each of said holes and fastened thereto, a tube fastened to said last named plate at said hole and extending toward the other vertical plate of the associated cut out section, a thermocouple extending through said tubes, a closure for the forward end of said probe including a tapered end, a closure for the inner end of said probe, and means for circulating coolant through said probe.

7. Apparatus according to claim 1 including a filter in said conduit.

8. Apparatus according to claim 1 including a thermocouple inserted into the vertical plate of each cut out section toward the outer end of said member.

9. Apparatus according to claim 3 in which each angle is a bulb-angle with the bulb being on the end of the long leg.

References Cited in the file of this patent

UNITED STATES PATENTS

| | | |
|---|---|---|
| 749,507 | Weber | Jan. 12, 1904 |
| 1,968,534 | Megow | July 13, 1934 |
| 2,260,794 | Steudel | Oct. 28, 1941 |
| 2,815,663 | Lupfer | Dec. 10, 1957 |
| 3,015,234 | Springfield | Jan. 21, 1962 |

FOREIGN PATENTS

| | | |
|---|---|---|
| 718,766 | Germany | Jan. 7, 1939 |